(12) United States Patent
Vallés Navarro et al.

(10) Patent No.: US 9,063,321 B2
(45) Date of Patent: Jun. 23, 2015

(54) ANAMORPHIC LENS

(75) Inventors: Alfredo Vallés Navarro, Barcelona (ES); Andrés Vallés Navarro, Barcelona (ES); Cristina Alcaide Garrido, Barcelona (ES)

(73) Assignees: Alfredo Vallés Navarro, Barcelona (ES); Andrés Vallés Navarro, Barcelona (ES)

( * ) Notice: Subject to any disclaimer, the term of this patent is extended or adjusted under 35 U.S.C. 154(b) by 0 days.

(21) Appl. No.: 14/005,494

(22) PCT Filed: Mar. 17, 2011

(86) PCT No.: PCT/ES2011/000077
§ 371 (c)(1),
(2), (4) Date: Oct. 1, 2013

(87) PCT Pub. No.: WO2012/123592
PCT Pub. Date: Sep. 20, 2012

(65) Prior Publication Data
US 2014/0016210 A1    Jan. 16, 2014

(51) Int. Cl.
G02B 13/08    (2006.01)
G02B 13/16    (2006.01)
G02B 13/18    (2006.01)

(52) U.S. Cl.
CPC ............... *G02B 13/08* (2013.01); *G02B 13/16* (2013.01); *G02B 13/18* (2013.01)

(58) Field of Classification Search
CPC .......... G02B 13/08; G02B 13/16; G02B 13/18
USPC .................................. 359/686, 671
See application file for complete search history.

(56) References Cited

U.S. PATENT DOCUMENTS

| 3,990,785 | A | 11/1976 | Hirose | |
| 7,113,344 | B2 * | 9/2006 | Nurishi et al. | 359/668 |
| 7,289,272 | B2 * | 10/2007 | Bowron et al. | 359/668 |
| 8,714,755 | B2 * | 5/2014 | Huang | 353/101 |
| 2002/0118466 | A1 | 8/2002 | Schauss | |
| 2004/0196570 | A1 | 10/2004 | Nurishi | |
| 2006/0050403 | A1 | 3/2006 | Neil | |
| 2009/0272807 | A1 | 11/2009 | Vinogradov | |
| 2014/0300973 | A1 * | 10/2014 | Neil | 359/671 |

* cited by examiner

*Primary Examiner* — David N Spector
(74) *Attorney, Agent, or Firm* — Davis & Bujold, P.L.L.C.; Michael J. Bujold

(57) ABSTRACT

ANAMORPHIC LENS, of the type used to horizontally compress images, in which the anamorphic group is positioned immediately behind the stop or iris (12); the anamorphic part is composed of two groups having two or more cylindrical lenses each, said two groups being aligned and the second group being rotated 90° relative to the first one, wherein one of said groups horizontally compresses the images and the other one vertically stretches them.

5 Claims, 4 Drawing Sheets

ANAMORPHIC LENS

FIELD OF THE INVENTION

The present invention describes an anamorphic lens of the type that compresses or stretches images in one direction, for instance in cinematography, in order to permit the adaptation of different screen proportions. The anamorphic group of the invention is positioned immediately behind the stop or iris of the lens, thereby obtaining few aberrations and thus good quality image, as well as an anamorphic lens of reduced dimensions and weight.

PRIOR ART

It is widely known that both television and cinematographic screens can have different image formats. For instance, classical 4:3 television ratio or the more current 16:9 ratio of HDTV (High Television TV) are habitual due to their better adaptation to the panoramic format of the cinema. Obviously, there exist other formats and it is foreseeable that they will evolve and still new ones eventually will emerge.

Anamorphosis is the reversible distortion of images and can occur through and optical procedure involving either cylindrical lenses or prisms.

Lenses or anamorphic adaptors either compress images horizontally or stretch them vertically, or both at the same time during shooting. Subsequently, another inverse anamorphic device carries out horizontal decompression of the images during projection thereof.

Generally speaking several systems for performing anamorphic compression are known. The anamorphic part can be positioned in front of the iris, at the object side, or behind the iris, at the image side.

As a first lens it is known the system that incorporates within the anamorphic group a focusing group provided with two adjustable cylindrical lenses at the longitudinal axis followed by a focusing group provided with spherical lenses. This double focusing solution, which was first disclosed by Isco Optic and is known in the market as "Arriscope", results in a very heavy lens having known problems like the "breathing effect", whereby the focal distance of the lens varies when focusing the image, or the "fat faces" effect whereby faces become distorted after stretching at short distances.

Another system made known and developed by Panavision comprises a double focus like the previous one although it has lenses of the anamorphic group that can rotate relative to one another so as to partially correct breathing and compression at short distances. However, it still displays some vertical breathing effect and is prone to overexposure. Besides, it is difficult to adjust the two focusing systems and as a result it becomes an optomechanical lens that is difficult and costly to manufacture.

A significant variation of these types of developments is represented by the Hawk Anamorphic system to Vantage formed by a focusing group followed by a fixed anamorphic group focused on infinite. This lens cannot overcome the breathing effect both on the vertical and horizontal axis.

The three above-described systems feature the anamorphic group in front of the stop or iris, at the object side.

Furthermore, other anamorphic lens structures have been developed in which the anamorphic group is positioned at the rear part of the iris, at the image side. This type of lenses are lighter in weight than the previous ones, do not pose neither focusing problems, nor distortion, nor breathing effect, but their main disadvantage is their poor image quality. The cylinders of the anamorphic group work at the convergent portion of the rays and for this reason the final image features residual aberrations.

Conversely, the main object of the present invention is to provide an anamorphic lens, which, apart from being light in weight and economical, can solve the known problems of poor quality images that feature distortion, breathing and compression change in respect of defocused objects and at distances that are very close to the image plane.

The present invention provides a compression factor of 2 or less.

These and other advantages of the present invention will become more apparent throughout the description of same that follows.

BRIEF DESCRIPTION OF THE INVENTION

The present invention discloses an anamorphic lens of the type of lenses used to optically alter the horizontal size of the images, through compression and decompression thereof, for instance in cinematography, in order permit the adaptation of different panoramic formats on the same filming surface, either analogical or digital, the anamorphic part being positioned immediately after the iris or stop of the lens.

The lens of the invention includes at least four different cylindrical lenses alternated with other spherical lenses conveniently positioned and having suitable sizes. Briefly, the anamorphic group is composed of at least four cylindrical lenses interspersed with different spherical lenses.

The novel position of the assembly, immediately positioned behind the lens, permits to make the most of the rays at a position close to collimation.

In this way, the objects of the invention are achieved, namely, obtaining an economical anamorphic lens, as far as manufacturing costs is concerned, that is also light in weight, has a compression factor of 2 or less and, as explained below, is designed to minimize the technical problems of the prior art.

BRIEF EXPLANATION OF THE DRAWINGS

For a better understanding of the invention it is accompanied by four sheets of merely illustrative and non-limiting drawings.

DETAILED EXPLANATION OF THE INVENTION

The invention comprises an anamorphic lens of the type used to compress images in one direction, the anamorphic group being positioned immediately behind the stop or iris (S12) of the lens.

Figure 1:
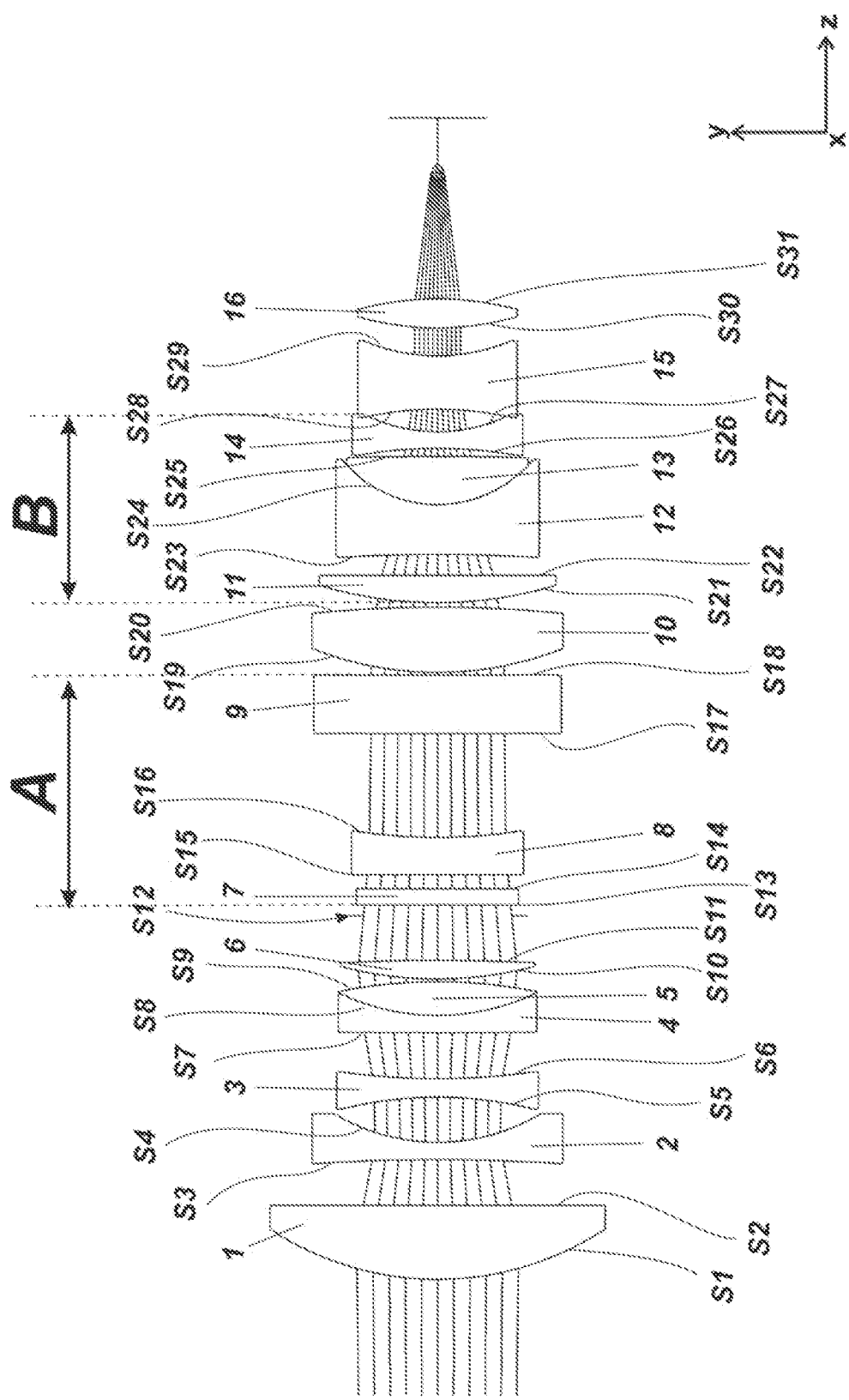
FIG. 1 shown a side view of a schematic representation of the arrangement and components of an anamorphic lens in accordance with the principles of the present invention in one of its possible embodiments.
Figure 2:
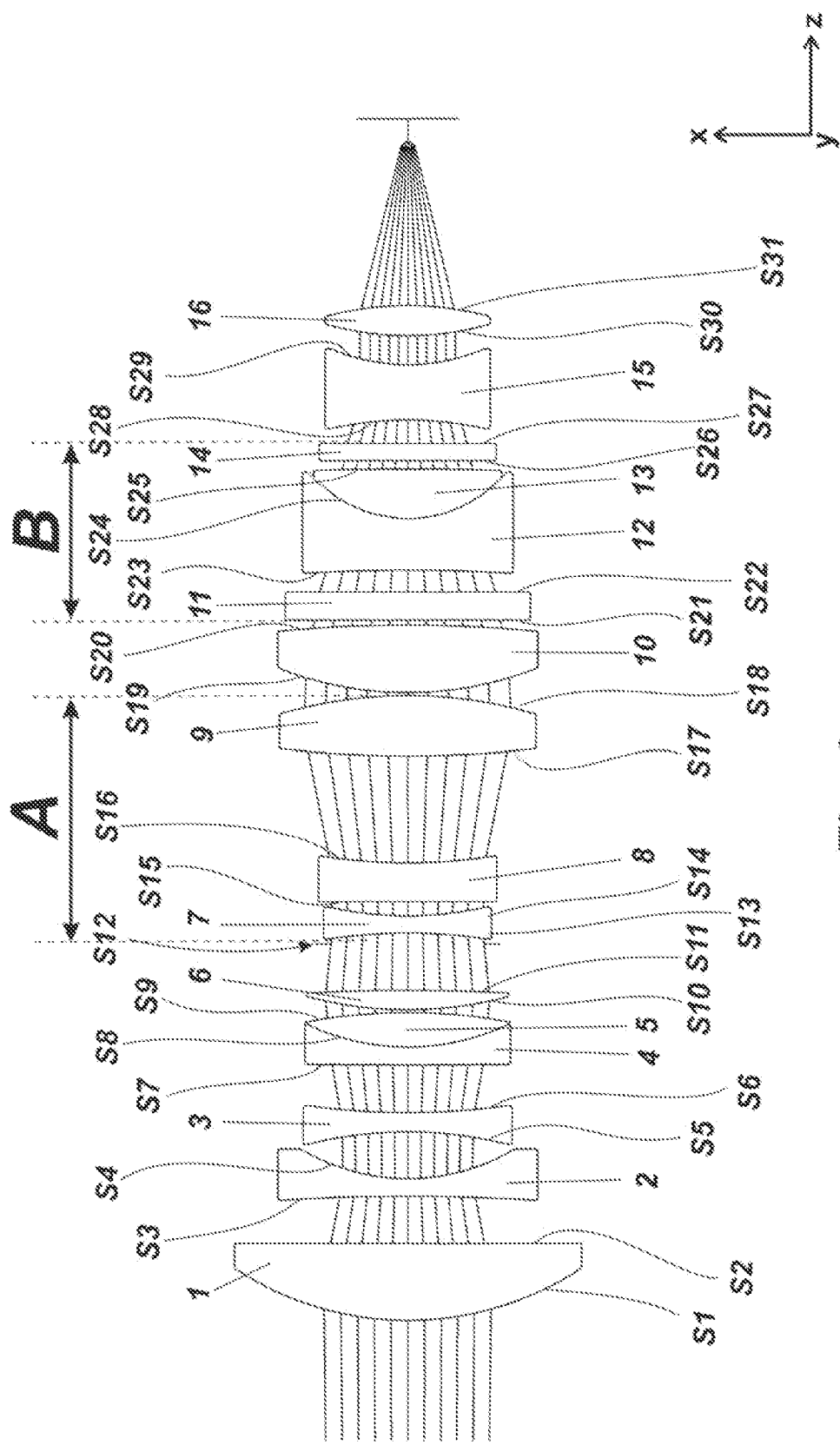
FIG. 2 shows a top view of the embodiment of the previous figure.
Figure 3:
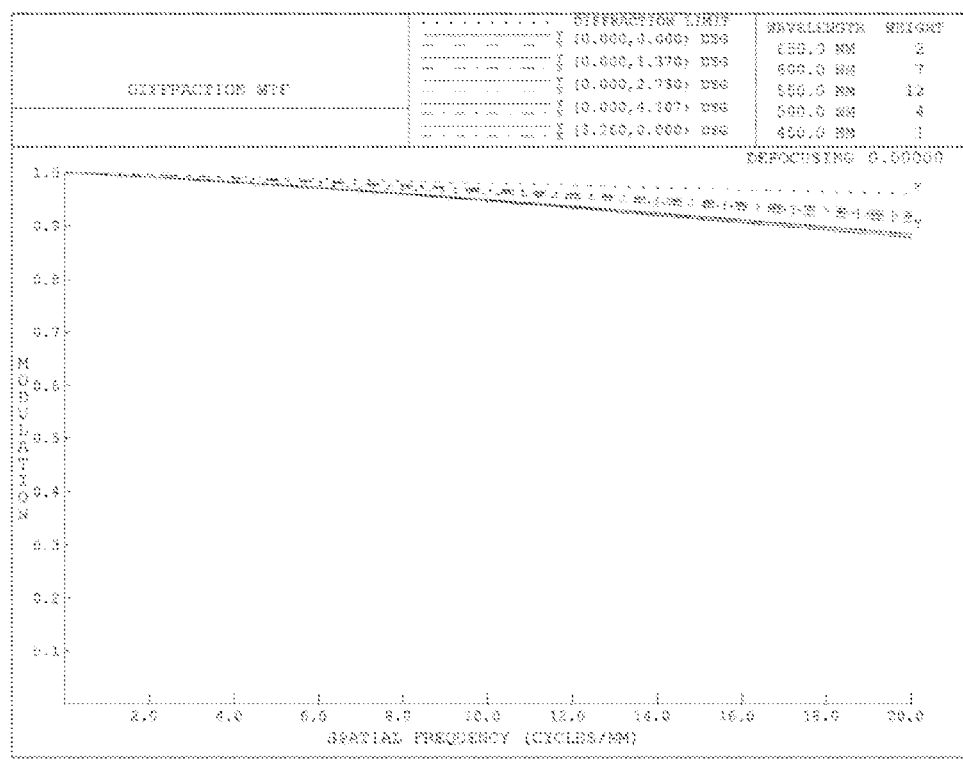
FIGS. 3 and 4 show the modulation transfer functions (MFT) of several rays of the system of FIGS. 1 and 2 respectively.
Figure 4:
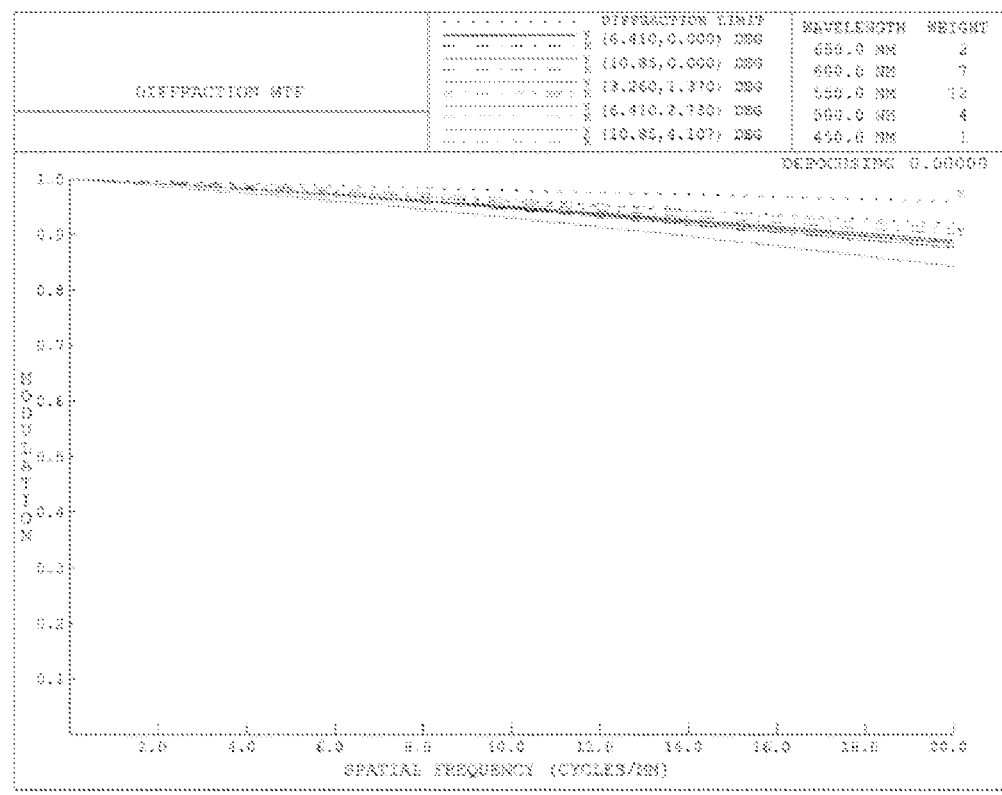

The table below displays the features of a preferred embodiment of the anamorphic lens corresponding to the data identifying FIG. 1.

TABLE I

| Lens | Surface | Radius X | Radius Y | Shape | Thickness or separation | Opening | Material $n_d$ | $V_d$ |
|---|---|---|---|---|---|---|---|---|
| 1 | 1 | 59.651 | | spherical | 13.5165 | 60.195 | 1.779 | 37.4 |
| | 2 | Infinite | | spherical | 8.3239 | 56.327 | | |
| 2 | 3 | −387.152 | | spherical | 3.1750 | 44.660 | 1.607 | 38.2 |
| | 4 | 39.359 | | spherical | 14.6763 | 38.142 | | |
| 3 | 5 | −77.204 | | spherical | 3.3748 | 35.637 | 1.644 | 37.2 |
| | 6 | 134.564 | | spherical | 1.9489 | 34.986 | | |
| 4 | 7 | 1841.890 | | spherical | 3.1599 | 35.062 | 1.729 | 30.3 |
| 5 | 8 | 44.564 | | spherical | 6.1538 | 35.058 | 1.665 | 54.6 |
| | 9 | −99.356 | | spherical | 5.8670 | 35.092 | | |
| 6 | 10 | 74.137 | | spherical | 3.3831 | 34.341 | 1.834 | 37.2 |
| | 11 | −394.165 | | | 2.7500 | 34.025 | | |
| STOP | 12 | | | | 2.0043 | 28.289 | | |
| 7 | 13 | −99.505 | infinite | cylindrical | 3.0000 | 28.204 | 1.560 | 68.8 |
| | 14 | 66.864 | infinite | cylindrical | 2.5329 | 28.472 | | |
| 8 | 15 | Infinite | | spherical | 6.8000 | 28.803 | 1.760 | 26.0 |
| | 16 | 106.000 | | spherical | 18.9558 | 30.268 | | |
| 9 | 17 | 214.178 | infinite | cylindrical | 10.5620 | 42.126 | 1.760 | 42.4 |
| | 18 | −86.077 | infinite | cylindrical | 0.5000 | 44.037 | | |
| 10 | 19 | 66.662 | | spherical | 12.0000 | 44.800 | 1.740 | 44.3 |
| | 20 | −253.776 | | spherical | 0.8248 | 43.062 | | |
| 11 | 21 | infinite | 80.514 | cylindrical | 4.9899 | 42.070 | 1.761 | 26.5 |
| | 22 | infinite | infinite | cylindrical | 3.8377 | 40.502 | | |
| 12 | 23 | −317.653 | | spherical | 9.0831 | 30.0969 | 1.670 | 31.7 |
| 13 | 24 | 24.228 | | spherical | 8.7885 | 27.5772 | 1.700 | 49.0 |
| | 25 | −699.999 | | spherical | 1.4853 | 26.6986 | | |
| 14 | 26 | infinite | −88.266 | cylindrical | 3.0194 | 26.0934 | 1.589 | 63.1 |
| | 27 | infinite | 31.793 | cylindrical | 4.1228 | 25.3896 | | |
| 15 | 28 | −66.384 | | spherical | 9.7264 | 24.2682 | 1.741 | 27.4 |
| | 29 | 36.450 | | spherical | 5.1279 | 25.3847 | | |
| 16 | 30 | 57.336 | | aspheric | 5.2776 | 30.6349 | 1.830 | 37.4 |
| | 31 | −59.820 | | spherical | 33.0311 | 30.9171 | | |
| Image | | infinite | | plane | | 31.4000 | | |

Table I has been made by means of the optical design program 'CODE V' of Optical Research Associates, Inc., which has also been used to make the optical diagrams for the appended figures.

The values corresponding to radius, thickness or separation, and opening are expressed in millimeters.

The material is described by the index of refraction $n_d$ and by the Abbe's number, $V_d = N_d - 1/[N_F - N_C]$. Letters d, F, C respectively correspond to wavelengths 587.5618 nm, 486.1327 nm and 656.2725 nm.

The aspheric surface (S30) is described by the following equation:

$$Z = \frac{(curv)Y^2}{1 + (1 - (1+K)(CURV)^2 Y^2)^{\frac{1}{2}}} + A \cdot Y^4 + B \cdot Y^6 + C \cdot Y^8 + D \cdot Y^{10}$$

where

Z: is the position measured along the optical axis of the lens, which corresponds to each Y coordinate Curv: is the inverse of the radius of curvature Y: is the height of the opening K: is the conic coefficient A, B, C, D: are the coefficient of order 4th, 6th, 8th and 10th.

The coefficients that describe the aspheric surface (S31) are:

CURV=−0.01671693
K=0
A=8.75413E-07
B=−1.46573E-09
C=2.5569E-12
D=−4.86557E-15

The date of the preceding table, which correspond to the preferred embodiment represented in the figures, can differ in other cases of preferred embodiments, but all of them are within the principles of the present invention.

It is worth noting in the configuration of the anamorphic group that it is formed by two cylindrical groups: group A and group B. Cylindrical group A is aligned in one direction and B is aligned at 90° relative to group A. That results in an image quality better than that obtained if the whole compression were made in one single direction.

Cylindrical group B has two or more cylindrical lenses (7 and 9), the first subgroup (7) being divergent and the second subgroup (9) being convergent, said group A being positioned immediately after the stop or iris (S12). Between these cylindrical lenses (7 and 9) other spherical lenses can be positioned like in the case shown in embodiment of FIG. 1. Cylindrical group A horizontally compresses the image. Rays enter and exit this group collimated or practically collimated, this permitting the existence of few residual aberrations and better final images than with the systems in which the anamorphic group is positioned at rearmost portion of the lens, next to the image plane, where rays feature high convergence.

Cylindrical group B is positioned behind the first one A. It comprises two or more cylindrical lenses (11 and 14) and vertically stretches the image. Other spherical lenses can be positioned, depending on each embodiment, between and after these cylindrical lenses. In addition, depending on each embodiment, other spherical lenses can be positioned between groups A and B.

In this way the objectives set are achieved. In fact the anamorphic lens of the invention permits to perform compressions equal or lower than 2× and at the same time preserve image quality better than that of the known anamorphic lenses with the rear cylindrical group.

It is understood that finish or shape details in the present case are liable to variation provided that the essence of the invention is not altered.

The invention claimed is:

1. An anamorphic lens of the type used to horizontally compress images comprising a plurality of optical surfaces aligned in a common optical axis and in which an anamorphic part is positioned behind a stop or iris of the lens, at the image side, wherein
   the anamorphic group is positioned immediately behind the stop or iris (S12), from where the rays exit collimated or practically collimated,
   said anamorphic group being composed of two groups (A and B) of cylindrical lenses,
   said group (A) of cylindrical lenses being aligned in one direction and
   said group (B) being aligned 90° relative to the previous group (A).

2. The anamorphic lens according to claim 1, wherein said cylindrical group (A) features at least two cylindrical lenses (7 and 9), where the first subgroup (7) is divergent and the second subgroup (9) is convergent; and in that other spherical lenses can be positioned between said cylindrical lenses (7 and 9).

3. The anamorphic lens according to claim 1, wherein said cylindrical group (B) is positioned behind the first one (A) and is composed of at least two cylindrical lenses (11 and 14), the first subgroup (11) being convergent and the second subgroup (14) being divergent; and in that other spherical lenses can be positioned between and after said cylindrical lenses (11 and 14).

4. The anamorphic lens according to claim 1, wherein other spherical lenses can be positioned between said groups (A and B).

5. The anamorphic lens according to claim 1, wherein said group (A) horizontally compresses the images and said group (B) vertically stretches them.

* * * * *